US005786526A

United States Patent [19]
Byon

[11] Patent Number: 5,786,526
[45] Date of Patent: Jul. 28, 1998

[54] AIRBAG TESTING APPARATUS AND A METHOD THEREFOR

[75] Inventor: Sung-Kwang Byon, Seoul, Rep. of Korea

[73] Assignee: Daewoo Electronics Co., Ltd., Seoul, Rep. of Korea

[21] Appl. No.: 780,082

[22] Filed: Dec. 23, 1996

Related U.S. Application Data

[63] Continuation-in-part of Ser. No. 534,430, Sep. 25, 1995, abandoned.

[30] Foreign Application Priority Data

Sep. 28, 1994 [KR] Rep. of Korea .................. 94-24444

[51] Int. Cl.$^6$ ........................................... G01P 21/00
[52] U.S. Cl. ........................................... 73/12.01
[58] Field of Search ........................ 73/1 D, 1 DV, 73/12.01, 12.08, 865.8, 865.9, 1.37–1.39, 1.41

[56] References Cited

U.S. PATENT DOCUMENTS 5,164,901 11/1992 Blackburn et al. .
5,172,598 12/1992 Wilson et al. .
5,373,722 12/1994 Spies et al. .
5,386,728 2/1995 Norton et al. .
5,452,210 9/1995 Rozanski .
5,650,578 7/1997 Fleming et al. .

Primary Examiner—Robert Raevis
Attorney, Agent, or Firm—Sixbey Friedman Leedom & Ferguson; Frank P. Presta

[57] ABSTRACT

An airbag testing apparatus includes a digital crash signal generating unit for generating a digital crash signal connected with a shock controller, a shock generator connected to the shock controller for generating shock control pulses, an acceleration-sensor supporting unit for transmitting the vibration produced from the shock generator to an acceleration sensor of an airbag system to be tested, an ECU test unit for mounting an ECU of the airbag system to be tested to monitor the operation of said ECU, a tank tester internally having a gas generator and an airbag module of the airbag system to be tested to which a pressure sensor and a displacement sensor are installed for sensing a pressure and displacement of the airbag module, and an output unit connected with the pressure sensor and displacement sensor for outputting the monitored pressure value and displacement value. Also, an airbag testing method is provided, thereby enabling to test performance of the airbag system while requiring low cost.

12 Claims, 6 Drawing Sheets

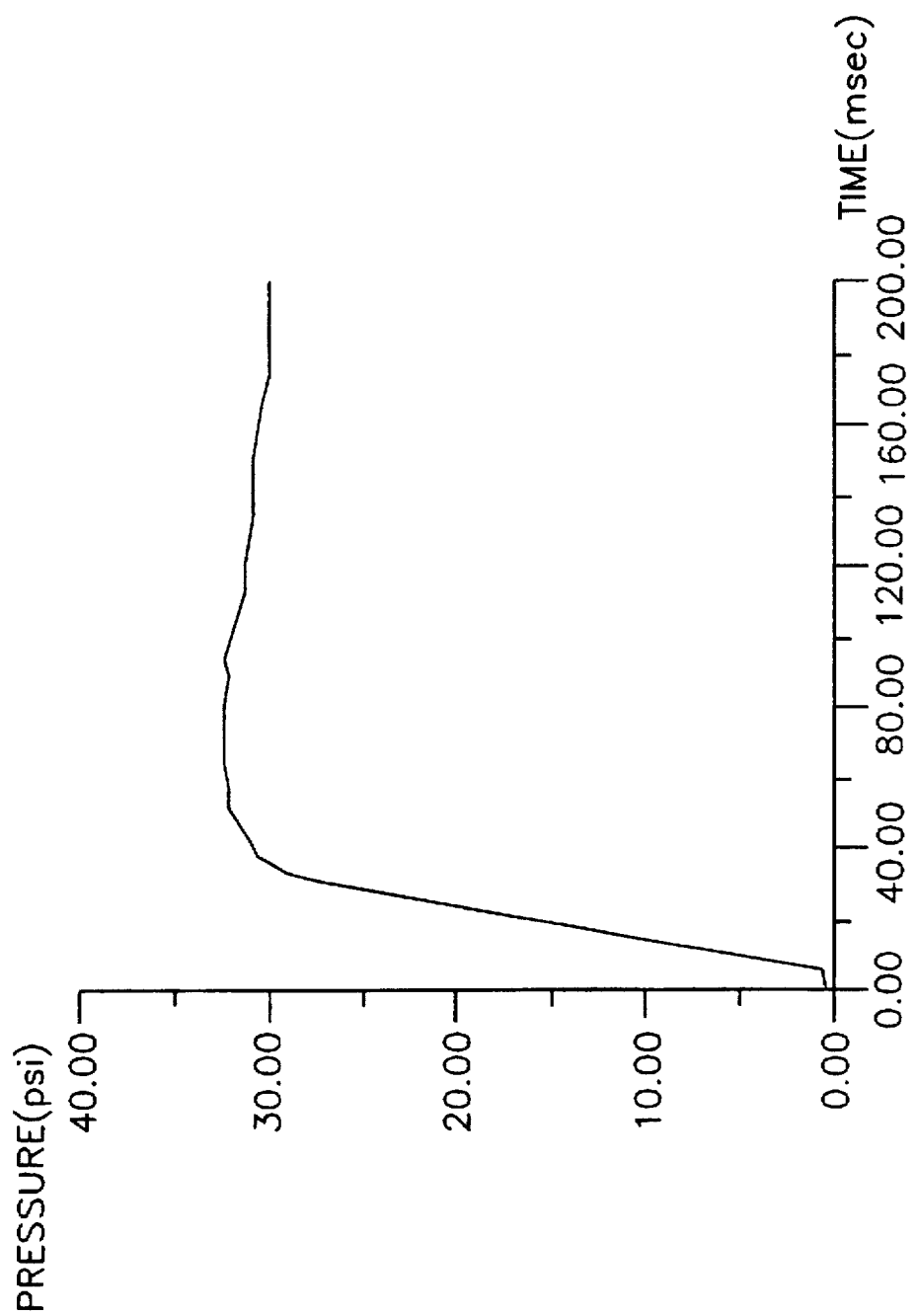

AIRBAG TESTING APPARATUS AND A METHOD THEREFOR

This is a continuation-in-part of application Ser. No. 08/534,430, filed on Sep. 25, 1995, which is now abandoned.

BACKGROUND OF THE INVENTION

1. Field of the Invention

The present invention relates to an airbag testing apparatus and method therefor, and more particularly to an airbag testing apparatus and method therefor capable of testing performance of an airbag without directly mounting the airbag to a vehicle to test it.

2. Description of the Prior Art

Various apparatuses have been developed to defend passengers in a vehicle. An airbag system among the above-mentioned apparatuses inhibits direct collision of a passenger to a car body in case of a car crash to thus guard the passenger. The airbag system includes a crash sensor such as an acceleration sensor, an electronic control unit (hereinafter referred to as "ECU") for determining to deploy or not to deploy the airbag by receiving a signal from the crash sensor, and a gas generator for receiving an airbag deployment signal from the ECU to generate gas which deploys the airbag. Also, the gas generated from the gas generator deploys an airbag module. The gas generator is formed by a squib and an inflator. The airbag deployment signal from the ECU is provided to the squib to explode the squib, which, in turn, incites the burst of the inflator, thereby generating the gas for deploying the airbag.

Generally, the airbag system should satisfy a reference of 5"-30 ms, and the time taken from the point of crash to the full deployment of the airbag should be within the range of 55 to 90 ms. When the airbag is fully deployed, a pressure of the airbag is within the range of 30 to 50 psi. In conformity with the Federal motor-Vehicle Safety Standard, the airbag is necessarily deployed when a car crashes while running at a speed of 12 mph and higher, but not to be deployed when the car crashes at a speed of below 8 mph.

In order to test the airbag whether it satisfies the above-described standards, a crash test, e.g., a sled test, is generally carried out. In the sled test, a frame of a car body is fabricated to mount the airbag system, so that the frame is directly crashed under diverse speeds and directions. For performing the sled test, the required frame numbers about at least 30, which primarily increases the cost of testing.

The current trend of mounting the airbag to a car continues, and, as a variety of car types are manufactured, it is required to develop an apparatus capable of testing performance of an airbag system with low cost.

SUMMARY OF THE INVENTION

The present invention is devised to solve the foregoing problems. It is a first object of the present invention to provide an airbag testing apparatus capable of eliminating a sled test or significantly decreasing the number of sled tests by use of acceleration data.

It is a second object of the present invention to provide an airbag testing method capable of eliminating a sled test or significantly decreasing the number of sled tests by use of acceleration data.

By adopting the airbag testing apparatus and method according to the present invention, performance of the airbag can be tested with low cost.

BRIEF DESCRIPTION OF THE DRAWINGS

The above objects and other advantages of the present invention will become more apparent by describing in detail preferred embodiments thereof with reference to the attached drawings in which:

FIG. 6 is a graph representation plotting a relationship between pressure and time with respect to the airbag, the graph being acquired by using the airbag testing apparatus according to the present invention.

DETAILED DESCRIPTION OF THE PREFERRED EMBODIMENTS

An embodiment of an airbag testing apparatus according to the present invention will be described in detail with reference to FIGS. 1 to 3.

Figure 1:
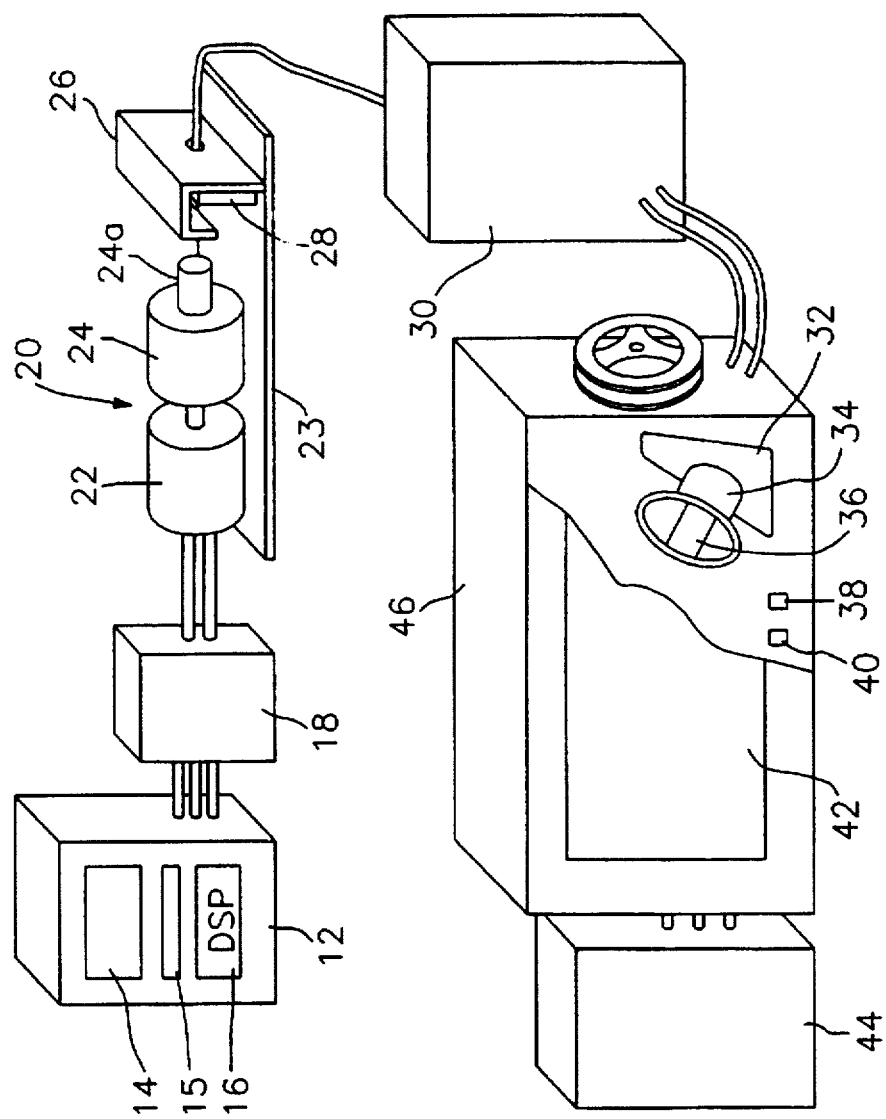
FIG. 1 is a perspective view showing a schematic construction of an airbag testing apparatus according to the present invention.
Figure 2:
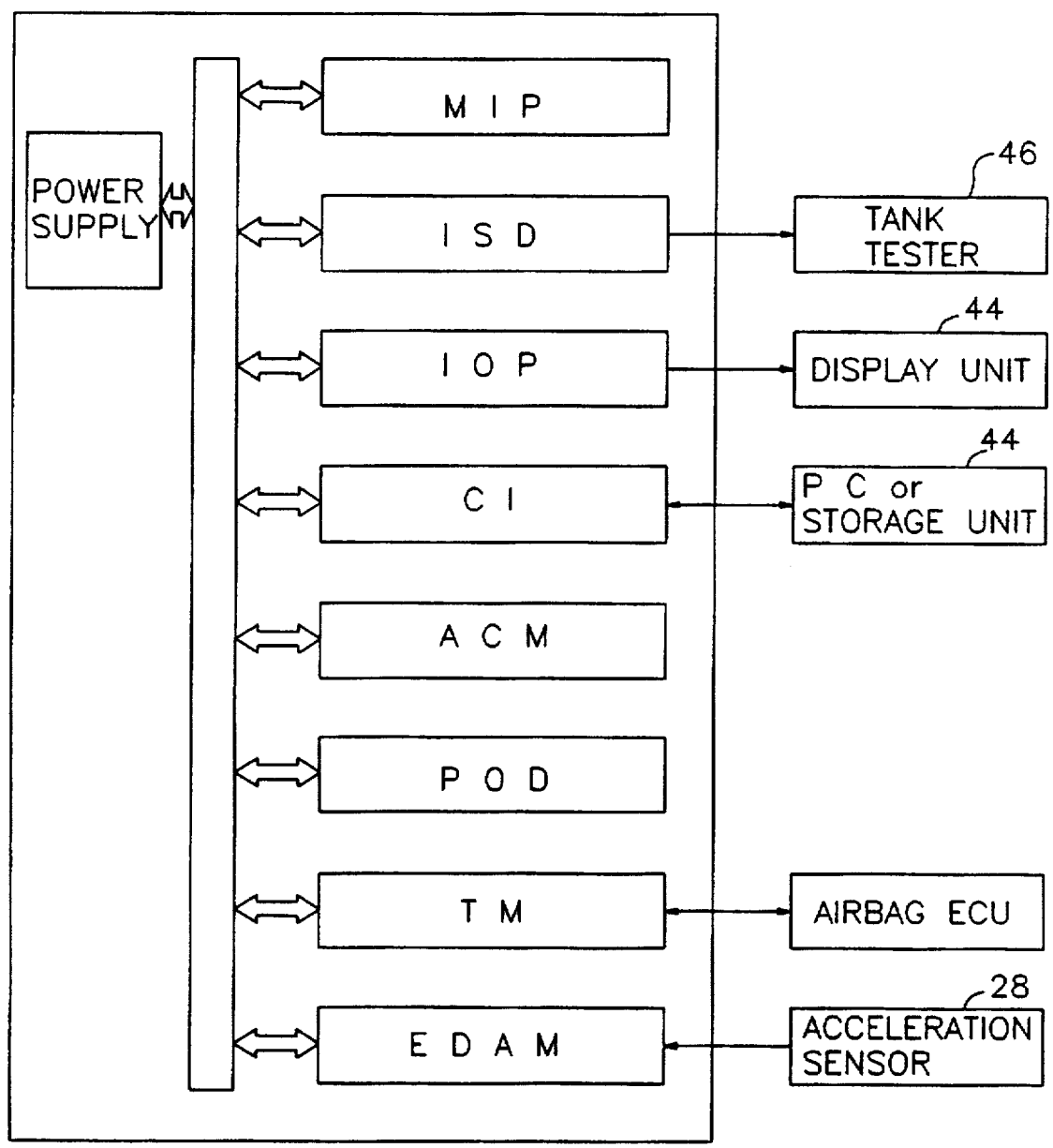
FIG. 2 is a block diagram of the airbag testing apparatus showing the construction of an ECU test unit and a connecting relationship between the ECU test unit and other constituents.
Figure 5:
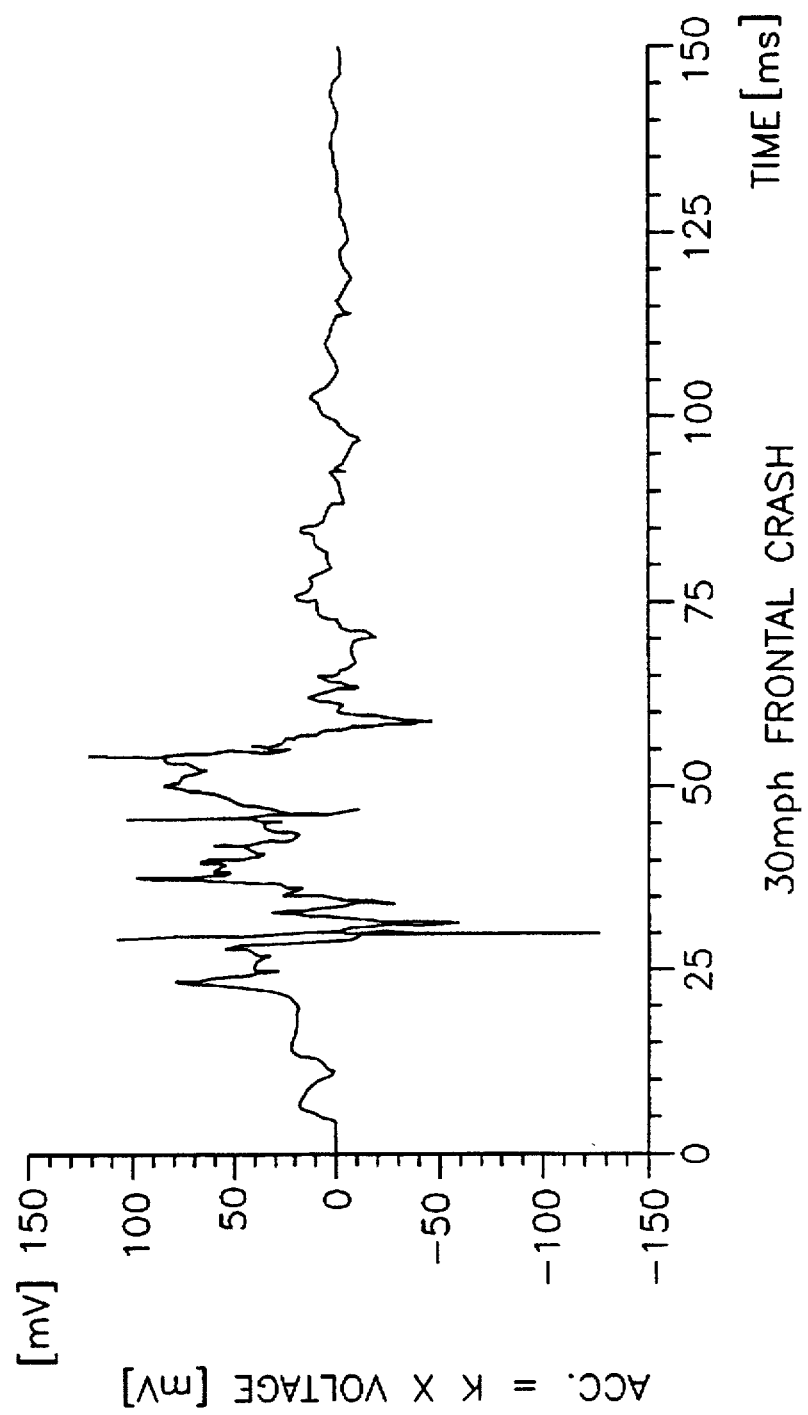
FIG. 5 is a graph representation plotting a relationship between acceleration and time at 30 mph frontal crash, the graph being an example of acceleration graphs acquired by sled tests in process of developing a car at which an airbag system to be tested is mounted and being used as raw data in the airbag testing apparatus of the present invention.

In FIG. 1, a digital signal generating section 12 includes a data input unit 14, a data storage unit 15 and a digital signal processor 16. Crash pulse data are supplied via data input unit 14. The crash pulse data may be acceleration data as shown in FIG. 5 and are obtained by actual car-crash tests or sled tests, for example, in process of developing a car. In FIG. 5, a vertical axis represents the voltage, that is, the acceleration value which is calculated by multiplying by a constant k the voltage which has been measured by an acceleration sensor at the actual car-crash tests or the sled tests. An output terminal of digital signal generating section 12 is connected to an input terminal of a shock controller 18. A digital signal processor 16 processes the crash pulse data inputted to provide a digital crash signal corresponding to the crash pulse data to shock controller 18 and data storage unit 15. In data storage unit 15, many kinds of digital crash signals which are acquired by several crash types can be stored to test the airbag system.

An output terminal of shock controller 18 is connected to a shock generator 20 which is formed of a DC motor 22. And the DC motor 22 is connected to the output terminal of shock controller 18 for converting the digital crash signal to the shock control pulses and a vibrator 24 operatively is connected to DC motor 22 to translate revolving movement of DC motor 22 into rectilinear movement. Shock controller 18 supplies shock control pulses to DC motor 22 in response to the digital crash signal which is inputted and converted to a converted signal to be outputted via the ouput terminal. When the number of revolutions of DC motor 22 is varied in accordance with the shock control pulses, vibration of vibrator 24 is varied, too.

The vibration of vibrator 24 is transmitted by the collision between a vibrating rod 24a and a holder 26 to holder 26 which supports an acceleration sensor 28 which receives the signal from the vibrator 24 of the airbag system to be tested. Shock generator 20 and holder 26 are coupled physically with each other by means of a base 23 as shown in FIG. 1. Holder 26 is located to be spaced out apart from vibrating rod 24a so that vibrating rod 24a can collide with holder 26. In accordance with the vibration of vibrator 24, acceleration sensor 28 provides crash pulses identical or similar to the crash pulse data which have been inputted or stored to digital signal generating section 12 to an ECU of the airbag system to be tested.

The ECU of the airbag system to be tested is connected to an ECU test unit 30 which controls the necessary peripheral devices for testing the air bag system. As shown in FIG. 2, ECU test unit 30 is composed of a main instruction, processor MIP, an inflator squib driver ISD, an input output processor IOP, a computer interface CI, an analog conversion module ACM, a port of debarkation POD, a target module TM, and an external data acquisition module EDAM. The ECU of the airbag system is connected to ECU test unit 30 via target module TM of ECU test unit 30. The ECU of the air bag checks whether the condition in which the air bag can be deployed is satisfied or not and sends the result of the checking to the ECU test unit 30 via target module TM mounted on the ECU testing unit. The target module TM serves as a connecting port with which the ECU of the airbag contacts and being connected with the main instruction processor MIP by a connecting line such as signal bus. The ECU testing unit receives the result from the ECU of the air bag and determines whether the air bag is deployed or not. Also, ECU test unit 30 receives the crash pulses from acceleration sensor 28 via external data acquisition module EDAM of ECU test unit 30. The crash pulses outputted from acceleration sensor 28 are inputted to main instruction processor MIP after analog-to-digital converting at analog conversion module ACM. An inherent algorithm of the airbag system is dumped to main instruction processor MIP, so that main instruction processor MIP serves as the ECU of the airbag system. Main instruction processor MIP of ECU test unit 30 determines whether the airbag is to be deployed or not with the inputted crash pulses and the dumped inherent algorithm of the airbag system. If it is determined that the airbag is to be deployed, inflator squib driver ISD of ECU test unit 30 produces a trigger signal to a squib (not shown) included in a gas generator 34 mounted within a tank tester 46. Preferably, inflator squib driver ISD may be a DC/DC converter outputting the trigger signal of about 12 voltages. ECU test unit 30 is connected to a display unit of an output unit 44 via input output processor IOP. ECU test unit 30 may also be connected to a personal computer or a storage unit of output unit 44 via computer interface CI. Additionally, ECU test unit 30 may have port of debarkation POD through which the operation of main instruction processor MIP is verified.

A visible window 42 formed of a bullet proof glass is provided to one side of tank tester 46 occupying in full or partial portion thereof. A pressure sensor 38 for sensing a pressure within tank tester 46 and a displacement sensor 40 for sensing a position of an airbag module 36 resulting from expansion are installed to tank tester 46. Displacement sensor 40 may be a high speed camera of 80 to 120 frames/sec. A mounting holder 32 for mounting gas generator 34 and airbag module 36 is provided to the inner portion of tank tester 46.

Visible window 42 enables an examiner to see the inside of tank tester 46 and to take photographs of an expansion process of the airbag for determining whether the airbag suitably expands to thereby protect the passenger. When expanding, an internal air pressure of the airbag can be indirectly calculated by sensing an internal air pressure of tank tester 46 by a pressure sensor 38. Displacement sensor 40 monitors the positional variation of the airbag in view of the expansion time.

Figure 3:
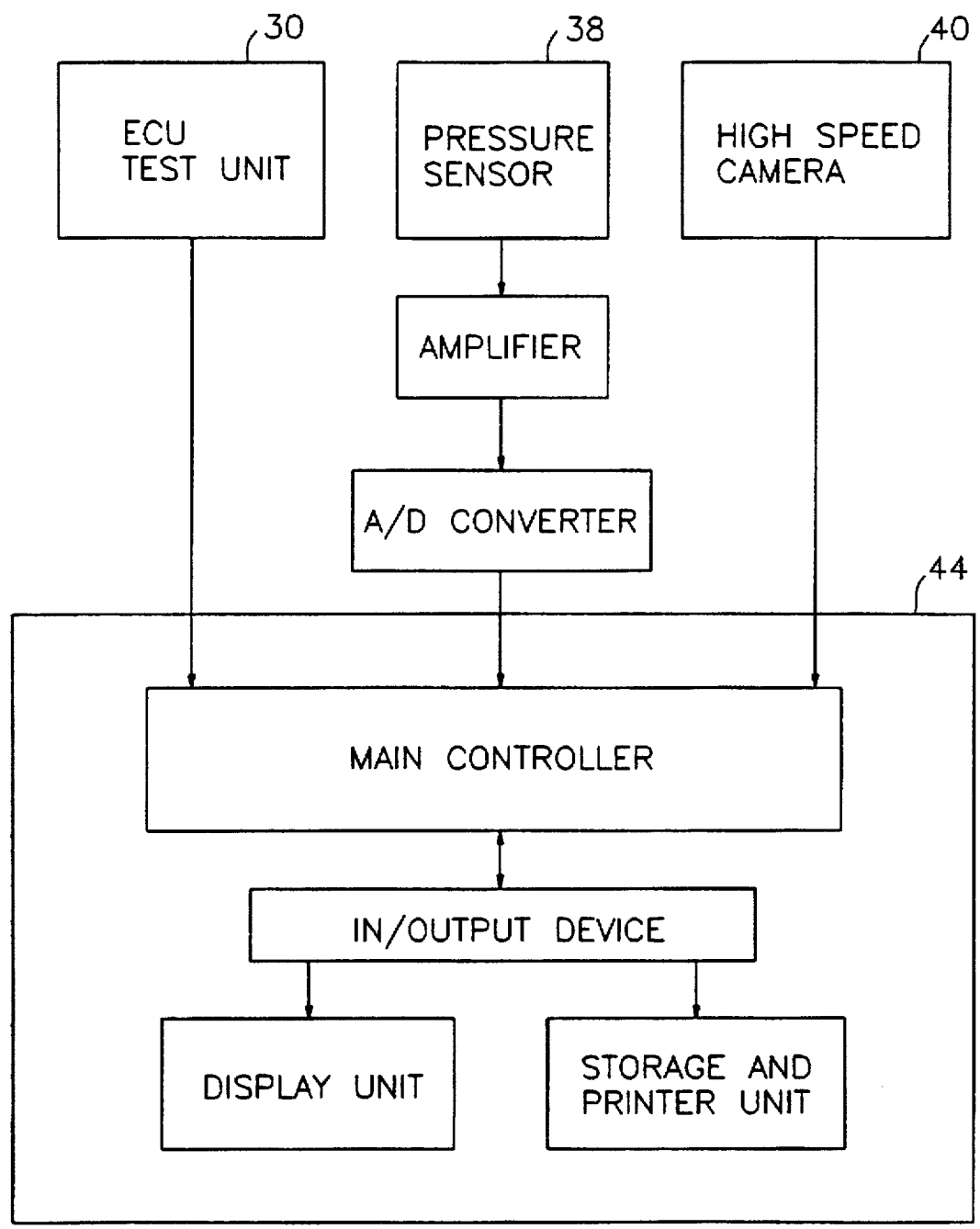
FIG. 3 is a block diagram of the airbag testing apparatus showing the construction of an output unit and a connecting relationship between the output unit and other constituents.

As shown in FIG. 3, output unit 44 may be composed of a main controller for controlling the overall operation of output unit 44, an input output device, a display unit, and a storage and printer unit for storing and printing required data such as a pressure data and a displacement data which may be a digitized image data. Outputs of pressure sensor 38 and displacement sensor 40 are supplied to the main controller of output unit 44. Generally, pressure sensor 38 is connected to the main controller via an amplifier and an A/D converter.

On the other hand, in place of digital signal generating section 12, shock controller 18, shock generator 20 and acceleration sensor 28, a function generator may be alternatively employed to provide the crash pulses to the ECU which forms the airbag system.

In addition, instead of mounting airbag module 36 within tank tester 46, tank tester 46 is fabricated to have the same volume as the airbag subjected to testing, thereby proceeding the test without mounting the airbag module. In this case, displacement sensor 40 is not required, and the pressure value measured by pressure sensor 38 is the internal air pressure of the airbag.

FIG. 6 shows a graph representation plotting the relation between the internal air pressure of the airbag and time obtained by using the airbag testing apparatus according to the present invention. In order to sufficiently defend the passenger, the maximum pressure of the airbag should be within the range from 30 to 50 psi, and the pressure reaches the maximum value within 55 to 90 ms from the time of collision. By using the graph plotted, it can be determined whether the airbag system subjected to testing satisfies the standards or not.

Hereinafter, an airbag testing method according to the present invention will be described in detail with reference to the drawings.

Figure 4:
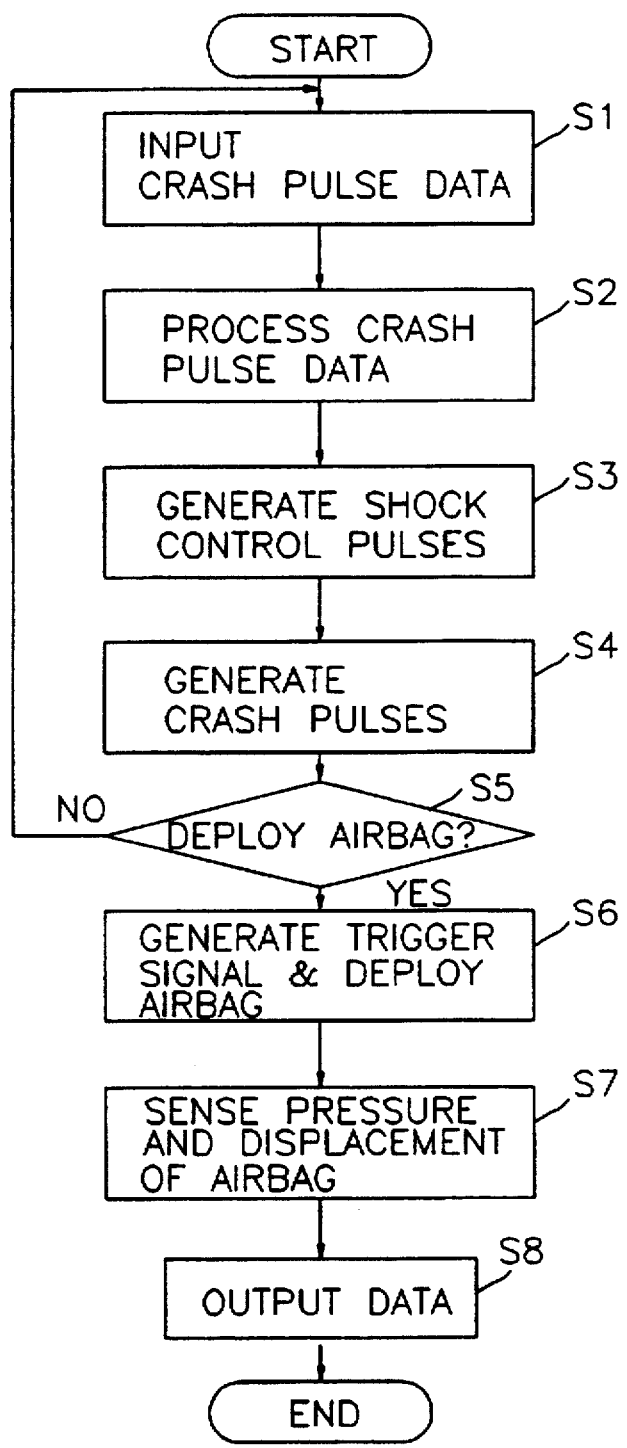
FIG. 4 is a flow chart showing an airbag testing method according to the present invention.

FIG. 4 is a flow chart showing the airbag testing method according to the present invention. In step S1, the crash pulse data are received via data input unit 14. The crash pulse data are selected from those obtained by performing a variety of crash tests. The crash pulse data inputted are processed by digital signal processor 16 to be converted into the digital crash signal available in shock controller 18 in step S2.

The digital crash signal from digital signal processor 16 is supplied to shock controller 18. Alternatively, the digital crash signal may be stored in storage means 15 to test the airbag system. In step S3, shock controller 18 produces the shock control pulses in response to the digital crash signal inputted to supply it to shock generator 20. In step S4, acceleration sensor 28 generates the crash pulses corresponding to the crash pulse data received in step S1.

The crash pulses generated in step S4 are monitored by ECU test unit 30 to determine whether the airbag is deployed or not in step S5. If it is determined that the airbag is not to be deployed, the process proceeds to step S1. When the airbag is determined to be deployed, the trigger signal is provided to the squib included in gas generator 34 within tank tester 46 to deploy the airbag in step S6.

In step S7, the air pressure and displacement of the airbag associated with the deployment of the airbag are monitored. In step S8, the air pressure and displacement data of the airbag monitored in step S7 are outputted.

By employing the airbag testing apparatus and method according to the present invention, a sled test for testing the performance of the airbag is not required or the number of the sled test is significantly decreased. As a result, the performance of the airbag can be tested with low cost.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. In a testing apparatus for testing performance of an airbag system including an acceleration sensor, an electronic control unit (ECU) connected to said acceleration sensor for determining to deploy or not to deploy the air bag in accordance with an input acceleration signal, a gas generator connected to said ECU for generating gas for deploying said air bag in accordance with a deployment signal from said ECU and an airbag module expanding by said gas from said gas generator, said testing apparatus comprises:

digital crash signal generating means for processing crash pulse data obtained by an actual car-crash test, and generating a digital crash signal;

a shock controller connected to said digital crash signal generating means for generating a control pulse in response to said digital crash signal from said digital crash signal generating means;

a shock generator connected to said shock controller for being vibrated in accordance with said control pulse from said shock controller;

acceleration-sensor supporting means for supporting said acceleration sensor forming said airbag system to be tested for transmitting the vibration generated from said shock generator to said acceleration sensor;

an ECU test unit for mounting said ECU of said airbag system to be tested to monitor the operation of said ECU;

a tank tester integrally having a holder for installing said gas generator and airbag module of said airbag system to be tested;

a pressure sensor installed at said tank tester for sensing the pressure of said airbag when said deployment signal from said ECU is supplied to said gas generator to deploy said airbag module; and an output unit connected with said ECU test unit and said pressure sensor for outputting monitored pressure values and data outputted from said ECU test unit, wherein said ECU test unit comprises a main instruction processor for controlling the overall operation of said ECU test unit, an inflator squib driver connected to said main instruction processor for generating a squib ignition signal to said gas generator installed within said tank tester when said main instruction processor determines to deploy said airbag, an input output processor connected to said main instruction processor for outputting data to said output unit, an analog conversion module connected to said main instruction processor for converting an analog acceleration signal outputted from said acceleration sensor into a digital signal, a target module serving as a connecting port with which said ECU of said airbag contacts and being connected with said main instruction processor by a connecting line, and an external data acquisition module connected to said main instruction processor for receiving said acceleration signal outputted from said acceleration sensor.

2. The testing apparatus as claimed in claim 1, further comprising a displacement sensor for sensing the displacement of said airbag when said deployment signal from said ECU which is controlled by said testing apparatus is supplied to said gas generator to deploy said airbag module.

3. The testing apparatus as claimed in claim 2, wherein said displacement sensor is a high speed camera of 80 to 120 frames/sec.

4. The testing apparatus as claimed in claim 1, wherein said output unit is a display unit which is connected to said input output processor.

5. The testing apparatus as claimed in claim 1, wherein said ECU test unit further comprises a computer interface, and said output unit is a personal computer which is connected to said computer interface.

6. The testing apparatus as claimed in claim 1, wherein said digital crash signal generating means comprises input means for receiving said crash pulse data, a digital signal processor for processing said crash pulse data to generate a digital crash signal, and storage means for storing said digital crash signal.

7. The testing apparatus as claimed in claim 1, wherein said shock generator comprises a DC motor connected to said shock controller and a vibrator operatively connected to said DC motor and having a vibrating rod which is vibrated in response to the actuation of said DC motor to transmit the vibration to said acceleration sensor by colliding with said acceleration-sensor supporting means.

8. The testing apparatus as claimed in claim 1, wherein said tank tester has a transparent visible window in a full or partial portion of one side thereof for enabling to see the inside of said tank tester.

9. In a testing apparatus for testing performance of an airbag system including an acceleration sensor, an electronic control unit (ECU) connected to said acceleration sensor for determining to deploy or not to deploy an airbag in accordance with an inputted acceleration signal, a gas generator connected to said ECU for generating gas for deploying said airbag in accordance with a deployment signal from said ECU and an airbag module having said airbag for expanding by said gas from said gas generator, said testing apparatus comprises:

digital crash signal generating means for processing real crash pulse data to generate a digital crash signal;

a shock controller connected to said digital crash signal generating means for generating shock control pulses in response to said digital crash signal outputted from said digital crash signal generating means;

a shock generator connected to said shock controller for vibrating in accordance with said shock control pulses outputted from said shock controller;

acceleration-sensor supporting means for supporting said acceleration sensor of said airbag system to be tested to transmit the vibration generated from said shock generator to said acceleration sensor;

an ECU test unit for mounting said ECU of said airbag system to be tested to monitor the operation of said ECU;

a tank tester internally having a holder for installing said gas generator and airbag module of said airbag system to be tested;

a pressure sensor installed at said tank tester for sensing the pressure of said airbag when said deployment signal from said ECU is supplied to said gas generator to deploy said airbag module;

a displacement sensor for sensing the displacement of said airbag when said deployment signal from said ECU is supplied to said gas generator to deploy said airbag module; and an output unit connected with said ECU test unit and said pressure sensor for outputting monitored pressure values and data outputted from aid ECU test unit, wherein said ECU test unit comprises a main instruction processor for controlling the overall operation of said ECU test unit, an inflator squib driver connected to said main instruction processor for generating a squib ignition signal to said gas generator installed within said tank tester when said main instruction processor determines to deploy said airbag, an input output processor connected to said main instruction processor for outputting data to said output unit, an analog conversion module connected to said main instruction processor for converting an analog acceleration signal outputted from said acceleration sensor into a digital signal, a target module connected to said main instruction processor for mounting said ECU, and an external data acquisition module connected to said main instruction processor for receiving said acceleration signal outputted from said acceleration sensor.

wherein said displacement sensor is a high speed camera of 80 to 120 frames/sec.

wherein said ECU test unit further comprises a computer interface, and said output unit is a personal computer which is connected to said computer interface.

wherein said digital crash signal generating means comprises input means for receiving said crash pulse data, a digital signal processor for processing said crash pulse data to generate a digital crash signal, and storage means for storing said digital crash signal.

wherein said shock generator comprises a DC motor connected to said shock controller and a vibrator operatively connected to said DC motor and having a vibrating rod which is vibrated in response to the actuation of said DC motor to transmit the vibration to said acceleration sensor by colliding with said acceleration-sensor supporting means.

wherein said tank tester has a transparent visible window in a full or partial portion of one side thereof for enabling to see the inside of said tank tester.

10. In a method for testing an airbag system by use of a testing apparatus comprising digital crash signal generating means having input means, and a digital signal processor for processing crash pulse data to generate a digital crash signal; a shock controller connected to said digital crash signal generating means for generating a control pulse; a shock generator connected to said shock controller and including a DC motor and a vibrator for being vibrated in accordance with said control pulse from said shock controller; acceleration-sensor supporting means for supporting an acceleration sensor to transmit the vibration generated from said shock generator to said acceleration sensor; an ECU test unit for mounting an ECU of said airbag system to be tested to monitor the operation of said ECU; a tank tester internally having a holder for installing a gas generator and an airbag module of said airbag system to be tested; a pressure sensor for sensing pressure of said airbag module when said airbag module is deployed; a displacement sensor for sensing displacement of said airbag module when said airbag module is deployed; and an output unit connected with said pressure sensor and said displacement sensor for outputting the monitored pressure value and displacement value, said testing method comprising the steps of:

receiving said crash pulse data obtained by an actual car-crash test;

processing said crash pulse data to generate a digital crash signal suitable for said shock controller in said digital signal processor;

generating shock control pulses in said shock controller in response to said digital crash signal outputted from said digital signal processor and providing said shock control pulses to said shock generator;

generating crash pulses in said acceleration sensor in response to the collision between said vibrator and said acceleration-sensor supporting means and providing said crash pulses to said ECU test unit;

determining whether said airbag module is to be deployed in accordance with said crash pulses from said acceleration sensor;

returning to said step of receiving said crash pulse data when said airbag module is determined not to be deployed;

deploying said airbag module by generating a trigger signal to provide said trigger signal to said gas generator when said airbag module is determined to be deployed;

sensing the pressure and displacement of said airbag module by means of said pressure sensor and displacement sensor when said airbag is deployed; and outputting the pressure value and displacement value monitored in said step of sensing said pressure and displacement to said output unit.

11. The testing apparatus as claimed in claim 4, wherein said display unit is a monitor.

12. The method for testing the airbag system as claimed in claim 10, wherein said output unit is a monitor.

* * * * *